US006990396B2

(12) United States Patent
Wang et al.

(10) Patent No.: US 6,990,396 B2
(45) Date of Patent: Jan. 24, 2006

(54) METHOD AND APPARATUS FOR REACTION WHEEL DYNAMIC COMPENSATION IN LONG-DURATION DEPLOYMENT OF A LARGE REFLECTOR

(75) Inventors: Hanching Grant Wang, Hacienda Heights, CA (US); Richard A. Fowell, Rolling Hills Estates, CA (US); Che-Hang C. Ih, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 10/318,867

(22) Filed: Dec. 13, 2002

(65) Prior Publication Data

US 2004/0117074 A1 Jun. 17, 2004

(51) Int. Cl.
*G06F 7/00* (2006.01)

(52) U.S. Cl. .................... 701/13; 244/158 R; 244/165; 244/164; 244/169

(58) Field of Classification Search ................. 701/13, 701/1; 244/158 R, 165, 164, 169
See application file for complete search history.

(56) References Cited

U.S. PATENT DOCUMENTS

| | | | |
|---|---|---|---|
| 4,306,692 A | 12/1981 | Kaplan et al. | |
| 4,325,124 A | 4/1982 | Renner | |
| 4,949,922 A | 8/1990 | Rosen | |
| 5,312,073 A | * 5/1994 | Flament et al. | 244/168 |
| 5,626,315 A | * 5/1997 | Flament et al. | 244/168 |
| 5,816,540 A | 10/1998 | Murphy et al. | |
| 5,850,992 A | * 12/1998 | Flament et al. | 244/168 |
| 5,906,339 A | 5/1999 | Basuthakur et al. | |
| 6,032,903 A | 3/2000 | Fowell et al. | |
| 6,076,773 A | 6/2000 | Salvatore | |
| 6,138,953 A | * 10/2000 | Noyola et al. | 244/165 |
| 6,463,365 B1 | 10/2002 | Anagnost et al. | |
| 6,484,973 B1 | 11/2002 | Scott | |

FOREIGN PATENT DOCUMENTS

EP  0 780 296 A1  6/1997

OTHER PUBLICATIONS

G.A. Kyroudis, "Survey of Solar–Sailing Configurations For Satellite Attitude Control," AAS 91–486 pp. 815–838.

* cited by examiner

*Primary Examiner*—Olga Hernandez
(74) *Attorney, Agent, or Firm*—Gates & Cooper LLP

(57) ABSTRACT

A method and an apparatus for controlling the attitude and momentum of a spacecraft while deploying an appendage from the spacecraft. The method comprises the steps of predicting an environmental torque the spacecraft will be subjected to during deployment of the appendage, computing a magnitude and a direction of momentum to add to the spacecraft to at least partially oppose the predicted environmental torque, and storing the computed magnitude and direction of momentum in at least one of the momentum wheels before deploying the appendage.

42 Claims, 12 Drawing Sheets

METHOD AND APPARATUS FOR REACTION WHEEL DYNAMIC COMPENSATION IN LONG-DURATION DEPLOYMENT OF A LARGE REFLECTOR

CROSS-REFERENCE TO RELATED APPLICATIONS

This application is related to the following co-pending and commonly assigned patent application(s), all of which applications are incorporated by reference herein:

Application Ser. No. 10/318,715 entitled "METHOD AND APPARATUS FOR SOLAR TACKING MOMENTUM MAINTENANCE IN LONG-DURATION DEPLOYMENT OF A LARGE REFLECTOR," filed on same date herewith, by Hanching G. Wang, Richard A. Fowell, and Che-Hang C. Ih.

BACKGROUND OF THE INVENTION

1. Field of the Invention

The present invention relates to systems and methods for controlling spacecraft, and in particular to a system and method for controlling the spacecraft while deploying a large appendage such as a reflector.

2. Description of the Related Art

Satellite systems typically include appendages that are stowed during launch and deployed sometime thereafter. Typically, these appendages include solar wings (having the solar cells and the supporting structures), passive and/or active sensors, and antennas used for satellite-to-ground or satellite-to-satellite communications.

A typical goal during satellite appendage deployment is to maintain a spacecraft dynamic state close to that of rotating about an axis fixed in both the body and in inertial space. A rotation axis fixed in both the spacecraft and inertial space implies that the satellite angular rate vector direction is fixed in the satellite. This is an idealized state, and deployments are designed to keep the spacecraft state within acceptable bounds of this state.

One purpose of this goal is to keep the sun close to the desirable direction for the body, for solar power or thermal control reasons. Another is to keep the axis of symmetry of the toroidal telemetry and command antenna close to a known direction in space. The rotation itself helps largely to average out momentum buildup due to environmental torques, and ensures that any blockages of telemetry and command antenna line of sight by spacecraft structures are cleared by rotation. Such appendages must also be deployed in such a way that they are not damaged, and such that the long term stability of the satellite is not adversely affected.

Fortunately, since the inertia of each of the appendages is typically much smaller than that of the satellite itself, the attitude control system of the host satellite is typically adequate to assure the stability of the satellite during and/or after deployment.

A number of solar array deployment techniques have been developed. A first technique uses only the design variables of the satellite spin speed and the initial orientation of the spin vector in space, and the spacecraft North and South solar arrays are deployed in turn without any other attitude control. A second technique times the first deployment with respect to the sun rotational phase, and the second deployment with respect to the first, in order to meet the design constraints. A third technique initiates nutation with a thruster pulse or a wheel maneuver prior to the release of the first solar array, timed so that the constraints of the deployment are met over the deployment sequence. A fourth technique uses an internal wheel momentum to alter the dynamic motions during deployment to favorable effect. This includes using an internal wheel momentum bias along the spin axis ("superspin") to make the effective inertia ratio $\sigma_{eff} > 1$, thus rendering the spacecraft passively stable during the deployment. A fifth technique uses active wheel control during deployment to help damp out unwanted spacecraft body rates. Other deployment techniques have used similar methods, even for deployment of asymmetrical antennas measuring 49 feet in maximum dimension, and over long duration deployments lasting several hours.

In all of these techniques, the effects of momentum buildup due to environmental torques (including solar torques, thermal emission torques, atmospheric drag torques, and radio frequency (RF) emission torques) are small enough so that the effect on the satellite attitude is acceptably small, and are therefore neglected.

However, in some circumstances, the effect of environmental torques and the momentum of the deployed appendage(s) cannot be adequately accommodated by the attitude control system of the satellite. This can be the case, for example, when the satellite appendage is a large antenna.

Satellites have long been used to communicate information with terrestrially based ground stations. Communications systems have also been devised to permit worldwide communications to mobile receivers, but such designs have met with limited success. One of the reasons for this limited success is that it is difficult to design a lightweight, mobile receiver that can communicate with the satellite constellation, even a constellation in mid or low Earth orbits.

One solution to this problem is to equip one or more of the satellites with one or more high-sensitivity transmit/receive antennas. The problem with this solution is that to provide high sensitivity over wide beamwidths, the antennas must be quite large. This raises difficulties in three respects. First, the larger antennas have larger inertia than the smaller prior art antennas discussed above, thus imposing more stringent requirements on the design of the satellite control system, including the sensors (e.g. star and sun sensors, gyros and accelerometers), the attitude control thrusters, and the algorithms implemented by the control system. Second, since the larger antenna must be designed to fit within the storage bay of the launch vehicle deploying the satellite, the structures relating to its deployment are typically more complex than those of smaller appendages. For example, a foldable large antenna will generally have more joints and more structural elements than a smaller prior art antenna, and each of these structural elements must be folded out during deployment. Expressing the dynamics of the deployment of such antennas can be a daunting task, making it difficult for the satellite designer to assure that such deployment does not compromise satellite stability.

It is also desirable to perform the deployment over an extended period of time to avoid mesh tangling, and to even the thermal condition of truss joints. However, doing so subjects the satellite and the deployed appendage to a variety of disturbance torques (including solar torques) that further complicate the deployment process. It is possible, of course, to simply design the attitude control system to permit the rapid deployment of the appendage (e.g. by thruster torques), but such a solution would require a satellite control system that would be far more robust than is required at any time after the appendage is deployed, increasing the weight and cost of the satellite. Also, using thrusters during deployment raises the possibility that the appendage will be damaged during deployment.

Solar torquing techniques using satellite appendages have been applied to operational non-spinning satellites with relatively constant mass properties. For example, such techniques are disclosed in "Survey of Solar Sailing Configurations for Satellite Attitude Control," AAS 91-486, by George A. Kyroudis, which is hereby incorporated by reference herein. U.S. Pat. No. 5,816,540, issued to Murphy, U.S. Pat. No. 4,949,922, issued to Rosen, and U.S. Pat. No. 4,325,124, (also incorporated by reference herein) also disclose oscillating one or more of the solar arrays to apply solar torque (a technique sometimes known as "solar tacking"). While useful, such techniques are thought to be only applicable in operational, non-spinning satellites with relatively constant mass properties (e.g. not during deployment of a large appendage). Further, such techniques are limited in application, because the manipulation of the solar arrays can have a deleterious effect on the ability of the solar arrays to generate power for satellite operation.

Transverse momentum has been used to produce cross-product gyroscopic torques in other contexts, namely to oppose external boost motor torques. This technique is disclosed in U.S. Pat. No. 6,032,903, which is hereby incorporated by reference. However, this technique relies on a combination of gyroscopic torque and thruster torque, and, as described above, it is undesirable to use thruster torque during appendage deployment. Further, this technique is typically appropriate for different and much larger disturbance torques.

Magnetic torquing momentum management systems have also been used. Such techniques use a small gimbal offset in a gimbaled momentum wheel, such that, as the satellite body rotates 360 degrees in pitch over 24 hours, the peak transverse angular momentum over the day is largely minimized. However, this technique is not generally applicable to the problem of large appendage deployment, where the dynamic state is expected to be a rotation perpendicular to the pitch axis, at a rotational rate that is typically an order of magnitude higher.

What is needed is a system and method for controlling a satellite while deploying an appendage having a large moment of inertia. What is also needed is that the method be sufficiently robust to permit the design of a deployment sequence without requiring a detailed model of the inertia of the appendage as a function of time during the deployment sequence. The present invention satisfies that need.

SUMMARY OF THE INVENTION

To address the requirements described above, the present invention discloses a method, apparatus for controlling an attitude of a spacecraft while deploying an appendage from the spacecraft. The present invention initializes the transverse momentum perpendicular to the environmental torques experienced during appendage deployment to oppose them by cross-product gyroscopic torque. The method comprises the steps of determining a direction and amount of momentum to add to the spacecraft via the plurality of momentum wheels, storing momentum in at least one of the momentum wheels to provide momentum in the determined direction and in the determined amount, and deploying the appendage while controlling the attitude of the spacecraft at least in part by orienting the solar wings to apply differential solar torque to the spacecraft.

The present invention applies two elements (direct solar control and gyroscopic torque due to internal momentum perpendicular to the spacecraft rotational rate) to counter the effects of environmental torques on deployment. Unlike the prior art, the present invention recognizes and takes advantage of the fact the payload is inactive during satellite and appendage deployment. This reduces the power consumption and heat dissipation of the satellite, permitting greater flexibility in the manipulation of the solar arrays (because there is less need to keep the surfaces of the solar arrays directed at the sun and because the thermal radiators remain in the stowed position, permitting greater solar array movement without interference).

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
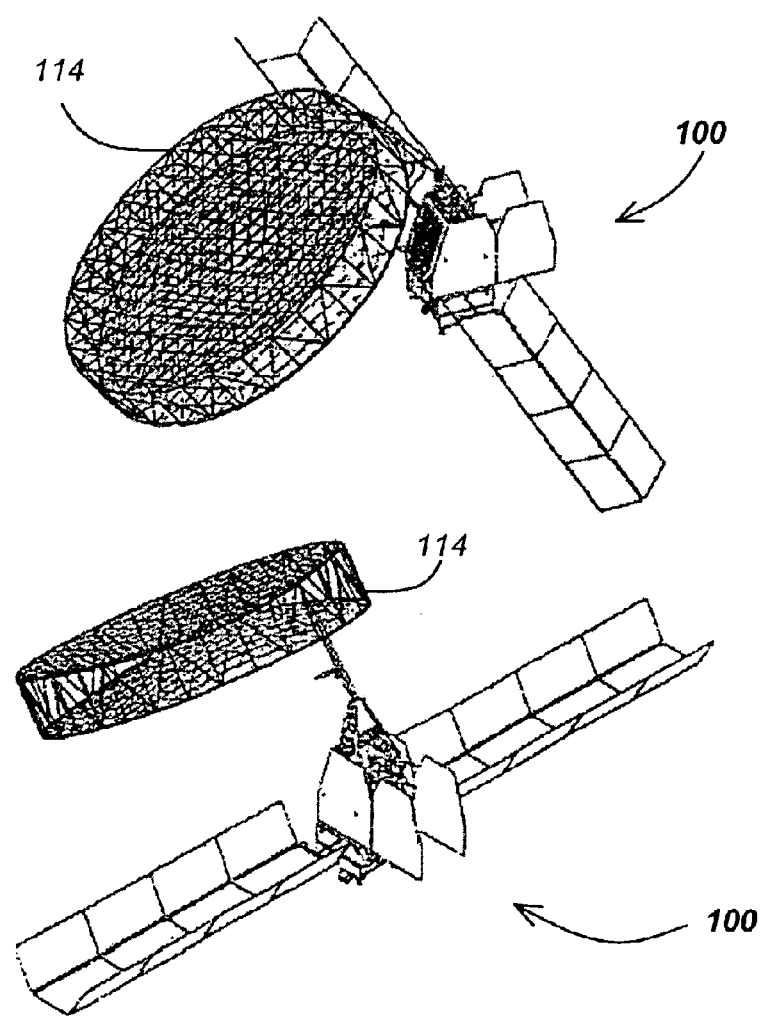
FIGS. 1A and 1B are diagrams depicting a three axis stabilized satellite.
Figure 1B:
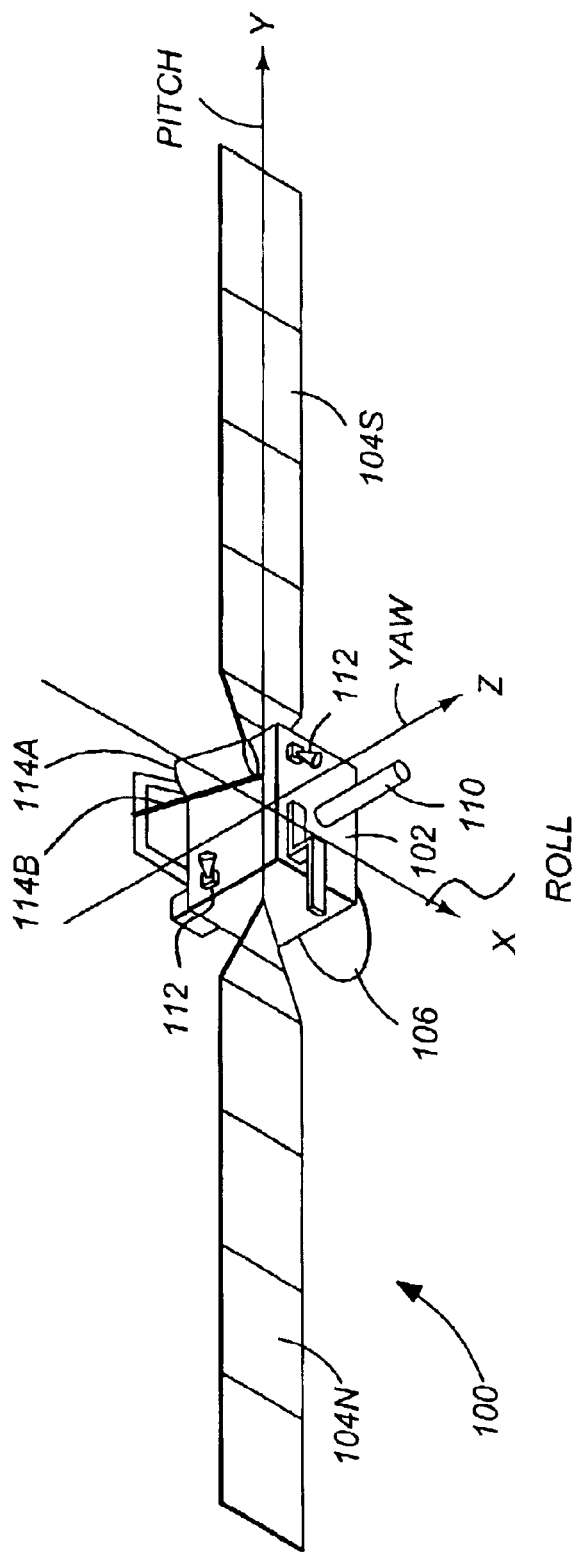

FIGS. 1A and 1B illustrate a three-axis stabilized satellite or spacecraft 100. FIG. 1A illustrates an appendage 114 in a deployed position, while FIG. 1B illustrates the appendage 114 in a stowed position. The satellite 100 has a main body 102, a pair of solar wings or panels 104N and 104S. The satellite 100 may also have a number of instruments and sensors such as one or more high gain narrow beam antennas 106, a telemetry and command omni-directional antenna which is aimed at a control ground station, a boom-mounted magnetometer, or an optical imager that is aimed at various ground targets.

The satellite 100 may also include one or more sensors 110 to measure the attitude of the satellite 100. These sensors may include sun sensors, earth sensors, and star sensors. The satellite 100 also includes one or more attitude control thrusters 112, for applying rotation torques to the satellite 100. The satellite also includes an antenna reflector 114A and a boom 114B with an associated deployment mechanism and driver components such as a combination of motors, springs, and damping mechanisms. Collectively, these elements are alternatively referred to hereinafter as the appendage 114.

The three axes of the spacecraft 100 are shown in FIG. 1B. The pitch axis Y lies along the plane of the solar panels 104N and 104S. The roll axis X and yaw axis Z are perpendicular to the pitch axis Y and lie in the directions and planes shown.

Figure 2:
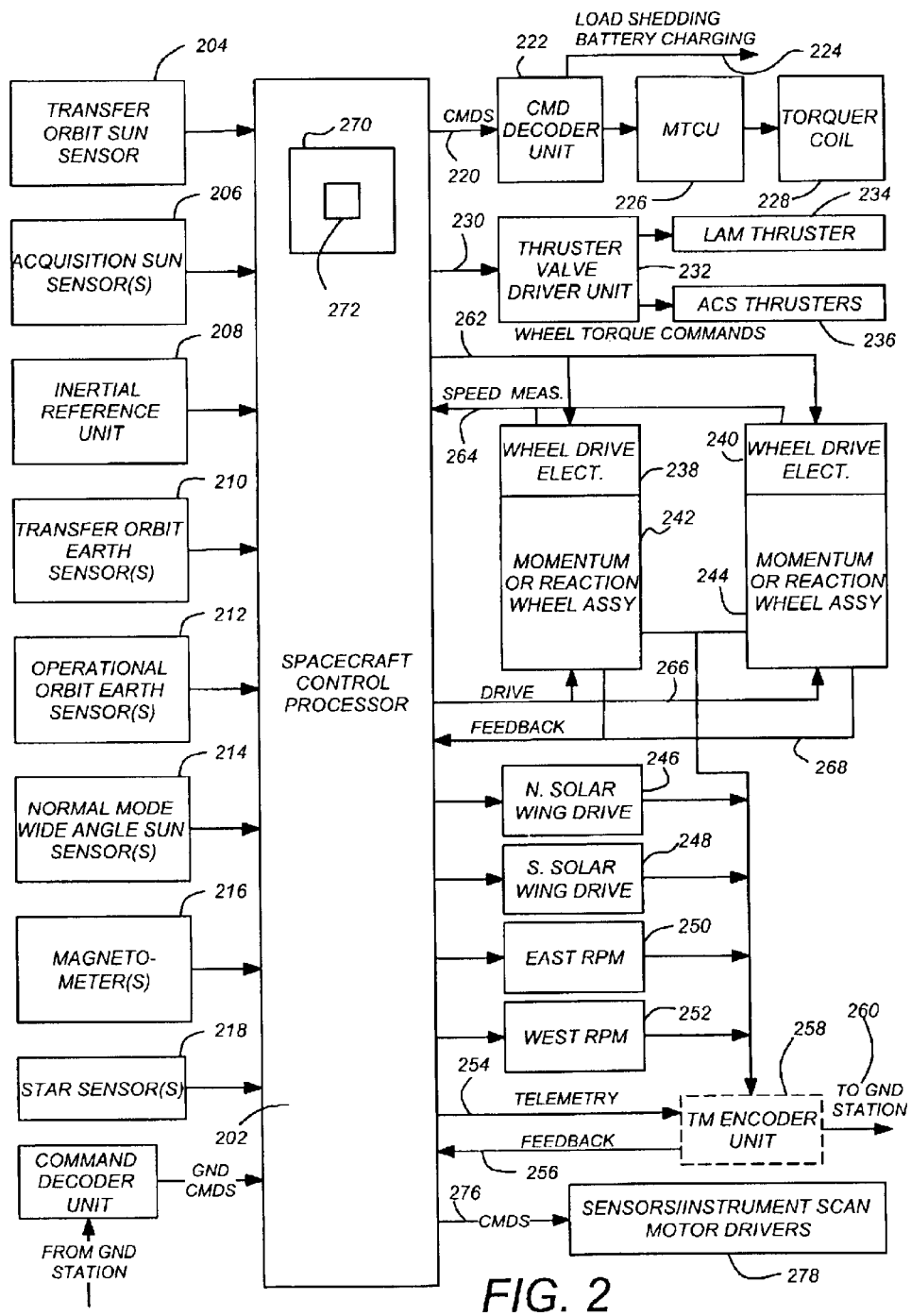
FIG. 2 is a block diagram depicting a satellite control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal mode. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218. Ground commands are also input into the spacecraft control processor. These commands determine the control functions of the processor and the scan patterns of some instruments and sensors.

The SCP 202 generates control signal commands 220 which are directed to a command decoder unit 222. The command decoder unit operates the load shedding and battery charging systems 224. The command decoder unit also sends signals to the magnetic torquer control unit (MTCU) 226 and the torque coil 228.

The SCP 202 also sends control commands 230 to the thruster valve driver unit 232 which in turn controls the liquid apogee motor (LAM) thruster 234 and the attitude control thrusters 236.

Generally, the spacecraft 100 may use thrusters, momentum/reaction wheels, or a combination thereof to perform spacecraft 100 attitude control.

Wheel torque commands 262 are generated by the SCP 202 and are communicated to the wheel drive electronics 238 and 240. These effect changes in the wheel speeds for wheels in momentum/reaction wheel assemblies 242 and 244, respectively. The speed of the wheels is also measured and fed back to the SCP 202 by feedback control signal 264.

When momentum wheel assemblies are used, the spacecraft control processor also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260. The spacecraft typically includes 4 reaction wheels, disposed to permit application of torques in any direction, and permitting for a backup torque wheel, however, different numbers of momentum wheels and momentum wheels of other design may be used. For the sake of simplification, these wheels will be referred to as momentum wheels, reaction wheel(s), or torque wheel(s) hereinafter.

For some satellites, the spacecraft control processor 202 also commands the scan motions of various sensors and instruments. The scan timings and patterns 276 generated by the SCP 202 are communicated to the scan motor drivers 278.

The SCP 202 also provides commands to the solar wing drives 246, 248, which manipulate solar wings 104N and 104S respectively. The solar wings 104N and 104S can be manipulated about the X axis and about the Y axis shown in FIG. 1. The SCP 202 can also step reflector positioning mechanisms (RPMs) 250 and 252 to adjust the antenna orientation. Modules 250 and 252 provide the mechanism positions to the TM encoder unit 258.

The SCP 202 also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
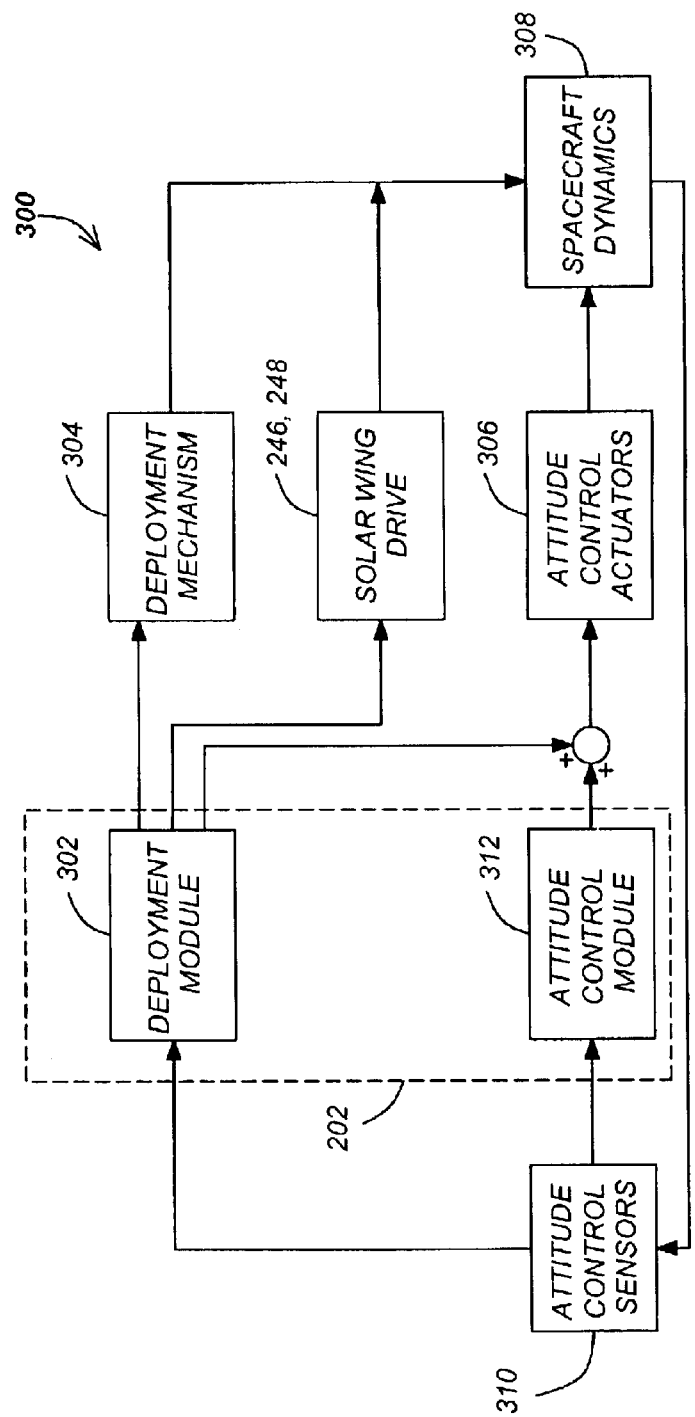
FIG. 3 is a block diagram of one embodiment of the spacecraft appendage control system.

FIG. 3 is a block diagram of one embodiment of a spacecraft 100 appendage control system 300. The spacecraft appendage control system 300 comprises a deployment module (DM) 302. The DM 302 can be implemented by separate electronic circuits, by the SCP 202 (as shown in FIG. 2), or by a separate processor dedicated to the functions described below.

The attitude control sensors 310, (which may include, by way of example, data from gyros and accelerometers in the inertial reference unit 208, operational earth orbit sensors 210, normal mode wide angle sun sensor(s) 214, magnetometers 216, star sensors 218, and or telemetered data), provides information to the attitude control module 312 to control the attitude of the spacecraft 100 under normal (non-deployment) conditions. The attitude control sensors 310 also provide such measurements to the deployment module (DM) 302. The DM 302 provides commands to the deployment mechanism 304, the solar wing drives 246, 248, and the attitude control actuators 306 (which include, by way of example, the ACS thruster(s) 236 and associated thruster drive units 232, and the momentum or reaction wheel assembly 242, 244 and associated modules). Such commands result in spacecraft 100 motion, which is represented by spacecraft dynamics 308.

Figure 4A:
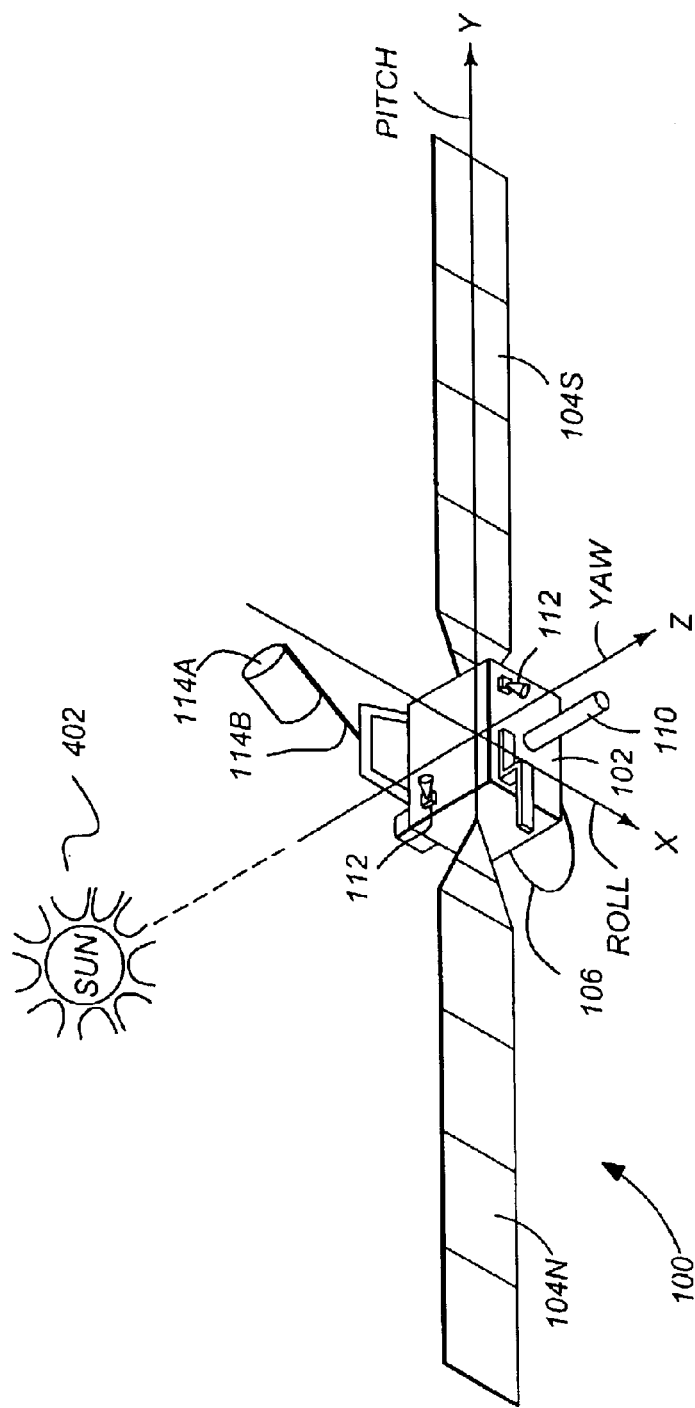
FIGS. 4A-4C are a diagrams illustrating the deployment of a spacecraft appendage.
Figure 4B:
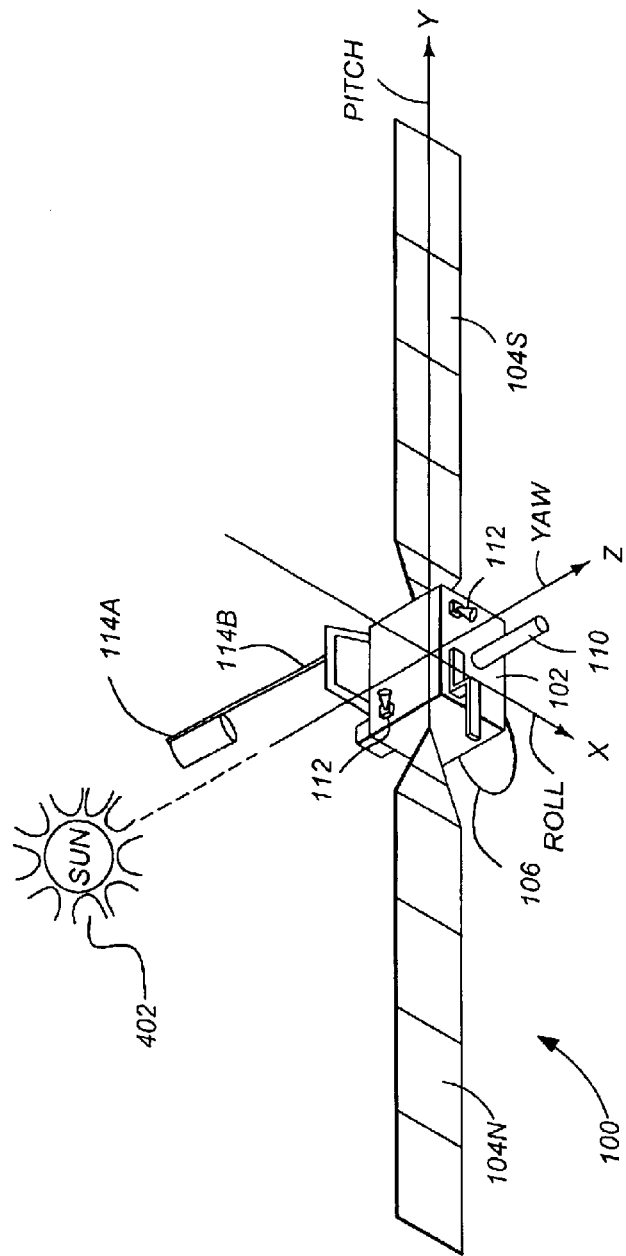
Figure 4C:
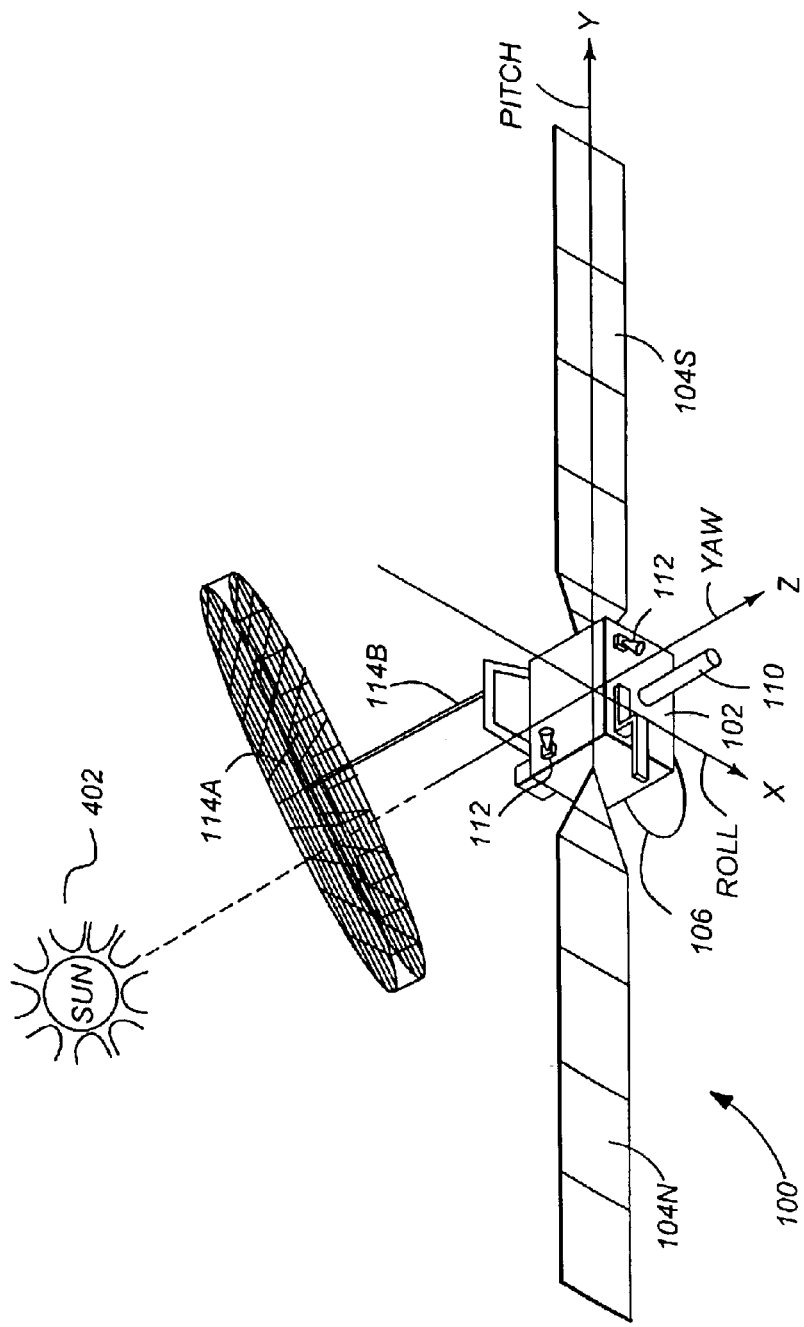

FIGS. 4A-4C are a diagram presenting an illustration of the spacecraft 100 during deployment of the appendage 114. In one embodiment the illustrated steps are performed in a sun-hold phase of satellite deployment after the sun has been acquired and tracked by either of the sun sensors 206 or 214.

FIG. 4A is a diagram of the spacecraft 100 during boom 114B deployment. When the spacecraft enters the sun-hold phase, the sun sensor boresight (on the X-Z plane) points toward the Sun 402. In the illustrated embodiment, the sun sensor 206 boresight is on the X-Z plane, 49 degrees away from the +X axis, and 41 degrees away from the −Z axis.

FIG. 4B is an illustration of the spacecraft 100 after the boom 114B is deployed (in one embodiment, the total deployment angle is 210 degrees). After the boom is deployed, the attitude control system supplies commands to the momentum wheels to recover the pre-deployment attitude of the spacecraft 100. The spacecraft 100 is then reoriented to the desired attitude for reflector deployment, as shown in FIG. 4C. This attitude is chosen to optimize the reflector 114A temperature and avoid sun shadowing on the reflector elements while maintaining the Sun 402 in the sun sensor field of view. In one embodiment, the Sun is 6 degrees away from the −Z axis and toward the +Y axis.

The reflector bundle is then released allowing it to bloom to full size. After blooming, the reflector is deployed by appropriate commands from the ground or the spacecraft itself, using stepping motors or other devices.

Spacecraft Control During Appendage Deployment

As described above, it is desirable to hold the spacecraft 100 in a specific orientation during the boom 114B and/or reflector 114A deployment. However, environmental torques as well as the boom 114B and reflector 114A deployment itself can cause significant attitude perturbations. Such perturbations can be compensated for by (1) use of gyroscopic torques using the momentum wheels 244 and 242, (2) orienting the solar wings 104 to apply differential torque to the spacecraft, or (3) by use of both techniques. These techniques are described below.

A dynamic equation for the deployment of the appendage 114 is $$T_{og} + T_{sp} + \Delta T_{st} = \frac{d}{dt}(I\omega + H) + \omega \times (I\omega + H) \quad \text{Equation (1)}$$

wherein $T_{og}$ and $T_{sp}$ are environmental (outgassing and nominal solar pressure, respectively) torques, $\Delta T_{st}$ is the controlled solar tacking torque (discussed further below), I is the total inertia of the spacecraft (typically expressed in a matrix as in Equation (2) below), ω is the spacecraft body spin rate (typically expressed as a vector), and H represents the momentum in the reaction wheels 244 and 242 (also typically expressed as a vector).

As discussed above, typically, the spin axis of the spacecraft 100 is along the sun-line (the line from the spacecraft 100 to the Sun 402). Typically, however, the spin axis of the spacecraft is not a major axis, and the spacecraft 100 is therefore not passively stable.

A desired amount and direction of H is computed to correct the environmental torques $T_{og}$ and $T_{sp}$, using Equation (1). As described above, certain spacecraft 100 to Sun 402 geometries are desirable (in order to meet thermal and power requirements). Based on a selected spacecraft 100 to Sun 402 geometry, a predicted outgassing $T_{og}$ and solar torque $T_{sp}$ are generated. These predicted values are used to compute H. The direction of H is perpendicular to the sun line and to the sum of the environmental torques $T_{og}$ and $T_{sp}$.

Since the spacecraft 100 is not typically symmetrical about the sun line (represented by off-diagonal terms in the matrix of Equation (2) below), the spacecraft 100 will wobble when rotated about the sun line, In one embodiment, the momentum H is also selected to balance this spacecraft 100 wobble, so that when the spacecraft 100 is rotated, its dynamics are like those of a symmetrical object being rotated along a major axis.

The wheel momentum can be resolved into two components: super-spin momentum, $H_s$, and transverse momentum, $H_t$. The wheel momentum along the spin axis is the super-spin momentum, $H_s$. $H_s$ is selected such that the effective inertia ratio $\sigma_{eff}$>1, thus rendering the spacecraft 100 passively stable during the deployment.

Assuming the spacecraft 100 is spinning along the axis-3 with spacecraft inertia:

$$\begin{bmatrix} I_{11} & 0 & 0 \\ 0 & I_{22} & 0 \\ 0 & 0 & I_{33} \end{bmatrix} \quad \text{Equation (2)}$$

and spin rate $\omega_s$ ($\omega_s$ is the spin rate of the spacecraft along the spin axis 3), with the added super-spin wheel momentum $H_s$, the equivalent dynamic inertia along the spin axis, $I_s$, can be computed by Equation (3) below.

$$I_s = I_{33} + \frac{H_s}{\omega_s} \quad \text{Equation (3)}$$

The effective inertia ratio can be computed by:

$$\sigma_{eff} = 1 + \sqrt{\left(\frac{I_s}{I_{22}} - 1\right)\left(\frac{I_s}{I_{11}} - 1\right)} \quad \text{Equation (4)}$$

Note that in a case where the spacecraft is symmetric and spinning about an axis of symmetry, $$I_{11} = I_{22} = I_{transverse} = I_t \quad \text{Equation (5)}$$

and $I_{33} = I_{spinline}$  Equation (6)

Substituting Equation (5) into Equation (4) yields Equation (7) below.

$$\sigma_{\mathit{eff}} = 1 + \sqrt{\left(\frac{I_s}{I_t} - 1\right)\left(\frac{I_s}{I_t} - 1\right)} = \frac{I_s}{I_t}$$  Equation (7)

Further substitution of Equation (3) into Equation (7) results in Equation (8), which represents a simplified representation of the effective inertia ratio for the case of a symmetric spacecraft spinning about an axis of symmetry.

$$\sigma_{\mathit{eff}} = \frac{I_{spinline} + \frac{H_s}{\omega_s}}{I_t} = \frac{I_{spinline} + \frac{\|\vec{M}_{spin}\|}{\omega_s}}{I_t}$$  Equation (8)

The wheel momentum placed in the transverse plane, $H_t$ is used to cancel the dynamic imbalance torque and the predicted mean out-gassing torque and mean solar torque, i.e., $$T_{og} + T_{sp} - \omega \times I\omega = \omega \times H_t$$  Equation (9)

A transverse momentum, $H_t$, is computed so as to counter external torque based on equation (9) above, and a superspin momentum, $H_s$, is selected that maximizes the effective inertia ratios and does not saturate the plurality of momentum wheels 242, and 244 (although two momentum wheels are shown in FIG. 2, the spacecraft 100 typically includes at least 3 momentum wheels and, for purposes of redundancy, an additional momentum wheel).

An optimal design for momentum wheel dynamic compensation for deployment of the appendage requires appropriate selection of both $H_s$ and $H_t$. In this passive deployment, the coning angle due to residual transverse torque (the transverse torque after the reduction by wheel transverse momentum) is proportional to the residual transverse torque, and inversely proportional to the total spacecraft momentum. This favors higher projected $H_s$ in the spin axis and higher spin rate $\omega_s$. The coning angle is also inversely proportional to the nutation frequency which favors higher $\sigma_{\mathit{eff}}$ (i.e., lower spin rate for fixed $H_s$) and favors higher $\omega_s$. Therefore, there exists an optimal selection of the spin rate, $\omega_s$, given the allocated super-spin $H_s$ from the momentum wheels 242 and 244. For the special case of a spacecraft 100 which is symmetric with respect to the spin axis, it can be shown, to the first order approximation, that the resultant optimal spin rate, $\omega_{s\_opt}$, and optimal effective inertia ratio, $\sigma_{\mathit{eff}\_opt}$, are $$\omega_{s\_opt} = \frac{H_s}{2I_{spinline}} \frac{\left(\frac{2I_{spinline}}{I_t} - 1\right)}{\left(1 - \frac{I_{spinline}}{I_t}\right)}$$  Equation (10)

$$\sigma_{\mathit{eff}\_opt} = \frac{1}{2 - \frac{I_t}{I_{spinline}}}$$  Equation (11)

Note that the above optimal values only exist when $I_{spinline} < I_t < 2I_{spinline}$. For an asymmetric spacecraft, the wobble angle increases as spin rate increases (while $\sigma_{\mathit{eff}}$ is reduced). The optimal spin rate $\omega_{s\_opt}$ and the optimal effective inertia ratio, $\sigma_{\mathit{eff}\_opt}$ can be computed by a numerical optimization algorithm.

Figure 5:
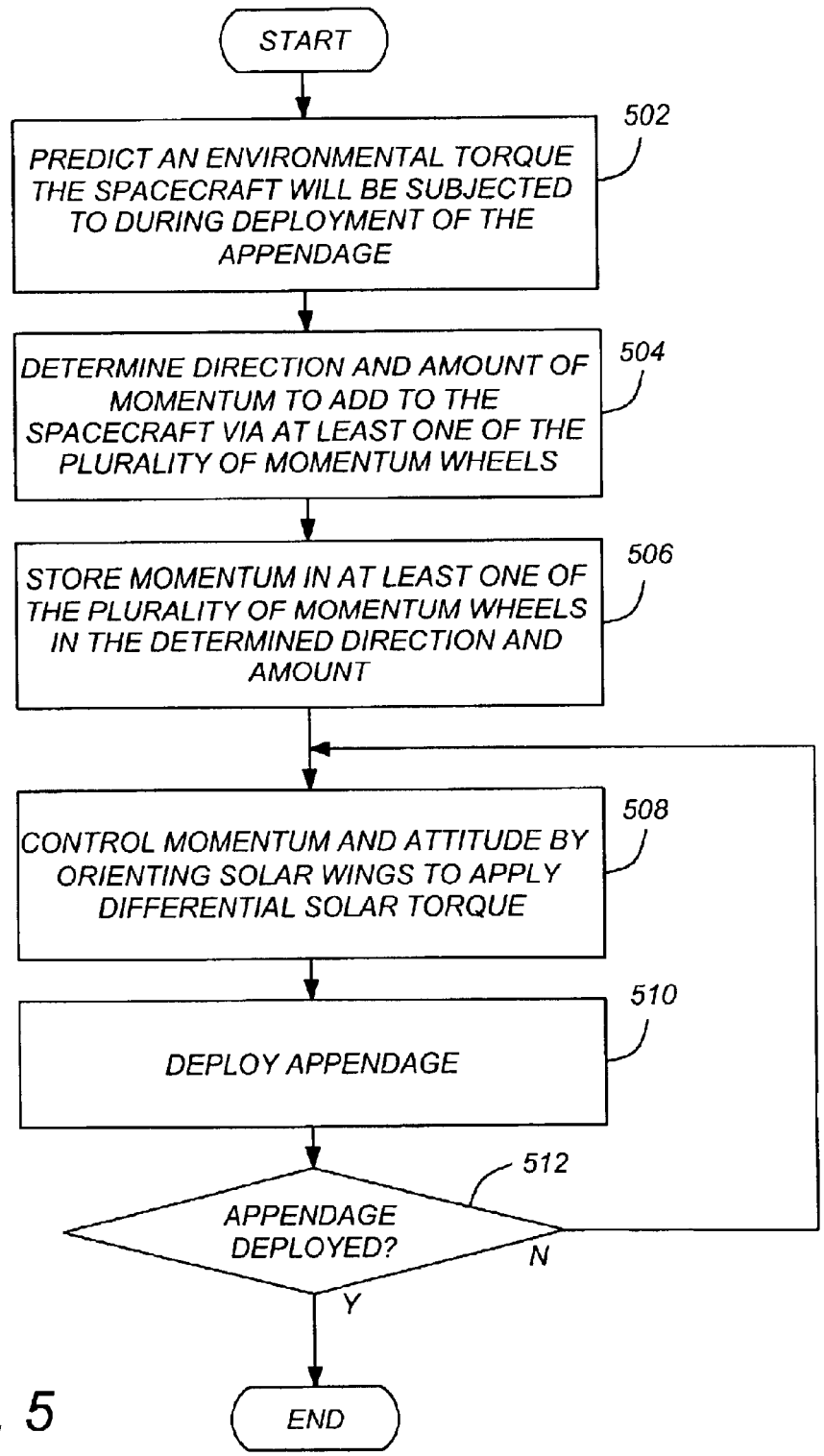
FIG. 5 is a flow chart presenting exemplary process steps used to practice one embodiment of the invention.

FIG. 5 is a flow chart presenting illustrative process steps that can be used to reduce the effect of appendage deployment perturbations, as described above. A prediction of the environmental torque that the spacecraft 100 will be subjected to during deployment of the appendage 114 is computed, as shown in block 502. This environmental torque, and other perturbations caused by the deployment of the appendage 114 will be compensated for by orienting the solar wings 104, by storing sufficient momentum in the momentum wheel(s) 242, 244, or a combination of both techniques. In one embodiment, the momentum wheel(s) 242, 244 are used to stabilize the spacecraft 100 during the appendage 114 deployment, and the solar wings 104 are oriented to prevent saturation of the momentum wheels 242, 244 while this is accomplished.

A direction and amount of momentum to be added to the spacecraft $\vec{M}$ is then determined, as shown in block 504.

Figure 6:
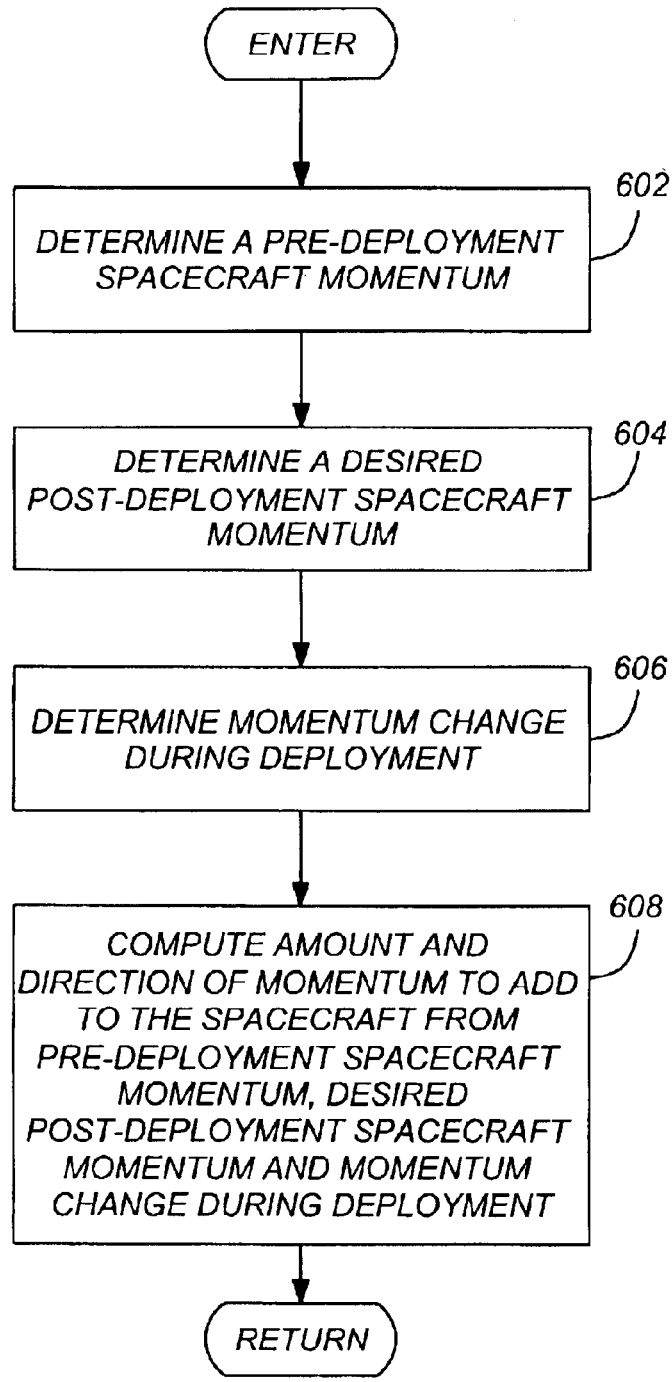
FIG. 6 is a flow chart presenting exemplary process steps used to compute the magnitude and direction of the momentum to add to the spacecraft before deploying the appendage.

FIG. 6 is a flow chart presenting exemplary method steps that can be used to determine the direction and amount of momentum to be added to the spacecraft $\vec{M}$. In blocks 602 and 604, pre-deployment spacecraft momentum $\vec{M}_b$, and a desired post-appendage deployment momentum $\vec{M}_a$ is determined. Momentum changes during deployment, $\vec{M}_l$ are determined, as shown in block 606. Finally, desired momentum to be added to the spacecraft 100 is determined from $\vec{M}_a$, $\vec{M}_b$, and $\vec{M}_l$ according to Equations (12)–(15) below:

$$\vec{M} = \vec{M}_a - \vec{M}_b - \vec{M}_l$$  Equation (12)

$$\vec{M} = \vec{M}_{spin} + \vec{M}_{transverse}$$  Equation (13)

$$\vec{M}_{spin} = \vec{M} \cdot \vec{u} = H_s$$  Equation (14)

$$\vec{M}_{transverse} = \vec{M} \cdot \vec{v} = H_t$$  Equation (15)

wherein $\vec{u}$ is the unit vector of the spin axis (i.e. $\vec{M}_{spin}$ is the projection of the total momentum into the spin axis, or the momentum component in the direction of the spin axis), and $\vec{v}$ is the unit vector of the transverse axis. From these values, the amount of and direction of momentum to add to the spacecraft 100 is determined, as shown in block 608.

The pre-deployment spacecraft momentum $\vec{M}_b$ can be computed from known or measured spacecraft parameters (e.g., rotational inertia) and data obtained from the attitude control sensors 310 and other navigational and attitude sensors such as those shown in FIG. 2. The desired post-deployment spacecraft momentum $\vec{M}_a$ can be determined based on desired dynamic condition during and post the deployment, and can be computed using spacecraft spin rate, wheel superspin, wheel dynamic balancing, and other spacecraft paramters. Similarly, the momentum change during deployment $\vec{M}_l$ can be estimated from spacecraft geometry and mass properties (including environmental torque sources such as ambient magnetic field, atmospheric drag, gravity gradient, and radiation pressure), navigational data, the deployment procedures and predicted spacecraft 100 responses to commands to perform such procedures.

Figure 7:
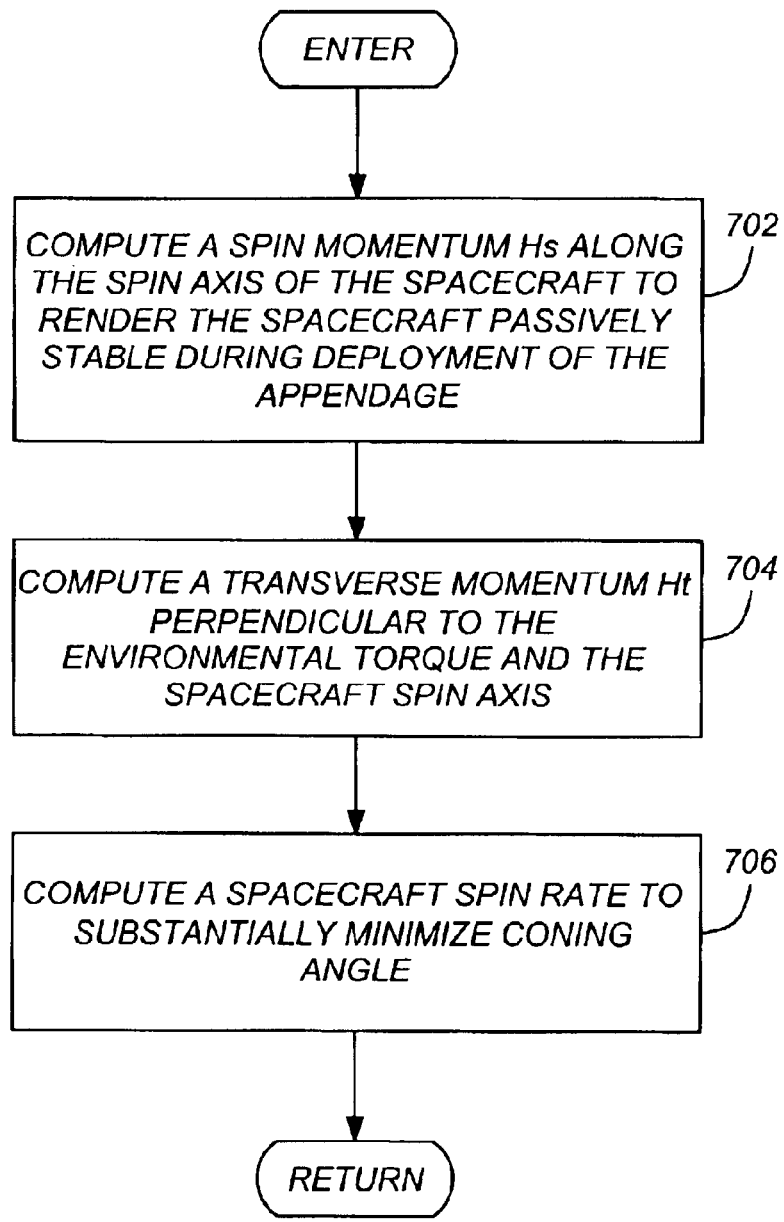
FIG. 7 is a flow chart further illustrating the computation of the momentum to add to the spacecraft before deploying the appendage.

FIG. 7 is a flow chart further illustrating the computation of the momentum $\vec{M}$ to add to the spacecraft 100 before deploying the appendage 114. As described in Equation (13) above, the total momentum $\vec{M}$ to be added to the spacecraft includes a transverse momentum, $H_t$ (which is computed so as to counter external torque based on equation (9) above), and a superspin momentum, $H_s$ (which is selected to render the spacecraft passively stable during deployment). These values are computed as show in blocks 702 and 704. Further, an value for the spin rate of the spacecraft $\omega_s$ that optimally minimizes the resulting coning angle of the spacecraft can be established using the relationships described in Equations (10) and (11).

In one embodiment, the process of determining the amount and direction of momentum to add to the spacecraft is performed by the deployment module 302 of SCP 202, however, this process can be performed in other modules of the SCP 202, in another spacecraft processor, or in dedicated circuitry. Typically, the momentum is added to the spacecraft 100 by adding momentum to the momentum wheels 242, 244. This can be accomplished by spinning up the momentum wheels 242, 244, while operating ACS thrusters 236 on the spacecraft 100.

Returning to FIG. 5, momentum is now stored, as shown in block 506. This is accomplished by providing one or more commands from the DM 302 one or more of the attitude control actuators 306, which include the momentum wheels 242 and 244. In one embodiment, the momentum is stored in the momentum wheels 242 and 244. The amount of momentum stored in each particular wheel is determined by the magnitude and direction of $\vec{M}$ the orientation and inertia of each respective momentum wheel.

To stabilize the spacecraft 100 and to permit the storage of momentum in the momentum wheels 242, selected attitude control thrusters may be activated. Because the large torque from the attitude control thrusters may negatively affect the deployment of the appendage, the momentum wheel spin up is typically performed before any portion of the appendage is deployed. However, this need not be the case. In the exemplary illustration presented in FIGS. 4A-4C, for example, it is possible to activate the attitude control thrusters when the spacecraft has boom deployed as shown in FIG. 4A and/or FIG. 4B, as the torque may not substantially effect the appendage before the reflector 114 is deployed.

Once the desired amount of momentum is stored in the momentum wheels, the appendage 114 is deployed, as shown in block 510. While the appendage 114 is being deployed, the attitude of the spacecraft 100 is controlled by the reaction wheels, further more, the attitude and/or momentum of the spacecraft 100 is controlled by orienting the solar wings to apply differential solar torque to the spacecraft 100, as shown in block 508. This process continues until the deployment of the appendage is completed, as shown in block 512.

Figure 8:
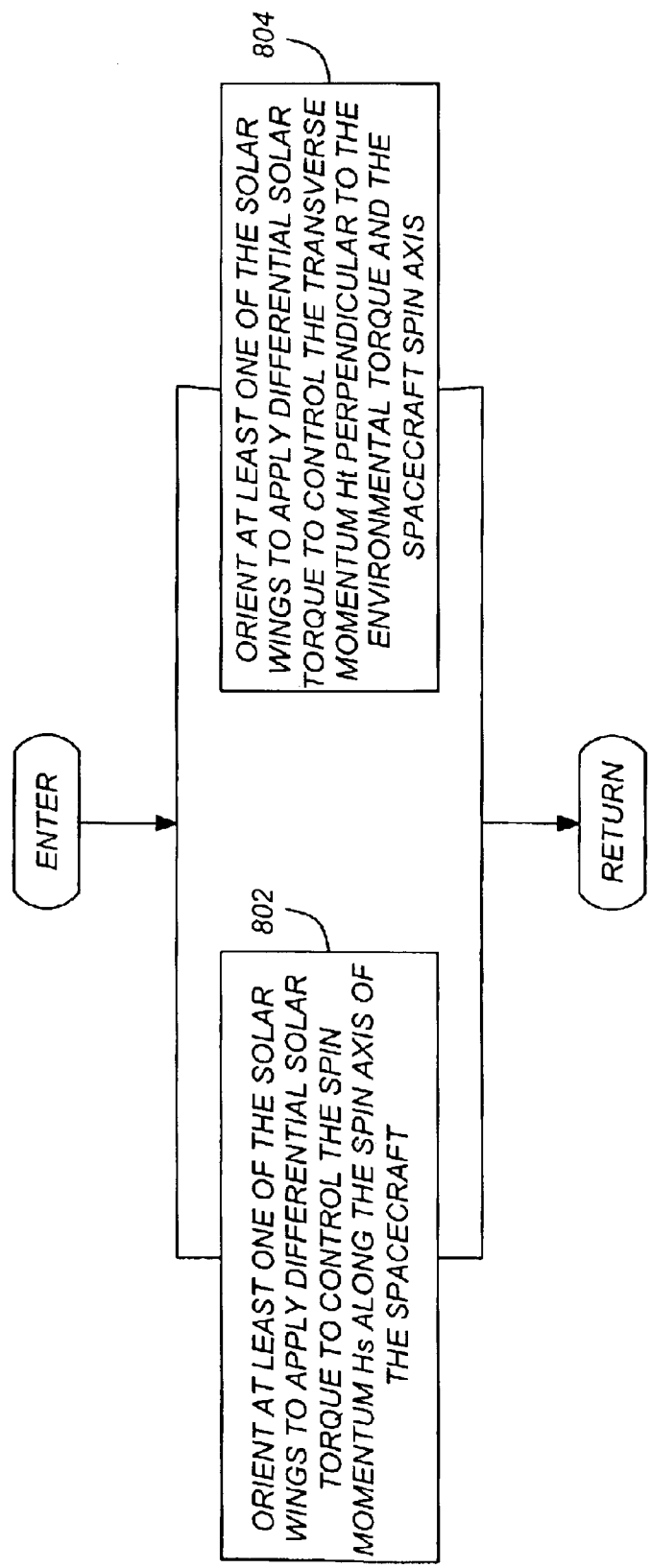
FIG. 8 is a diagram presenting illustrative method steps that can be used to control the attitude of the spacecraft and/or add or subtract momentum from spacecraft.

FIG. 8 is a diagram presenting illustrative method steps that can be used to control the attitude of the spacecraft and/or add or subtract momentum from spacecraft 100.

As shown in block 802, at least one of the solar wings 104 is oriented to apply differential torque to control the spin momentum $H_s$ along the spin axis of the spacecraft 100. This torque is known as windmill torque.

As shown in block 804, at least one of the solar wings 104 is also oriented to apply differential torque to control the transverse momentum $H_t$. Generally, these operations are performed concurrently, but this need not be the case.

Figure 9B:
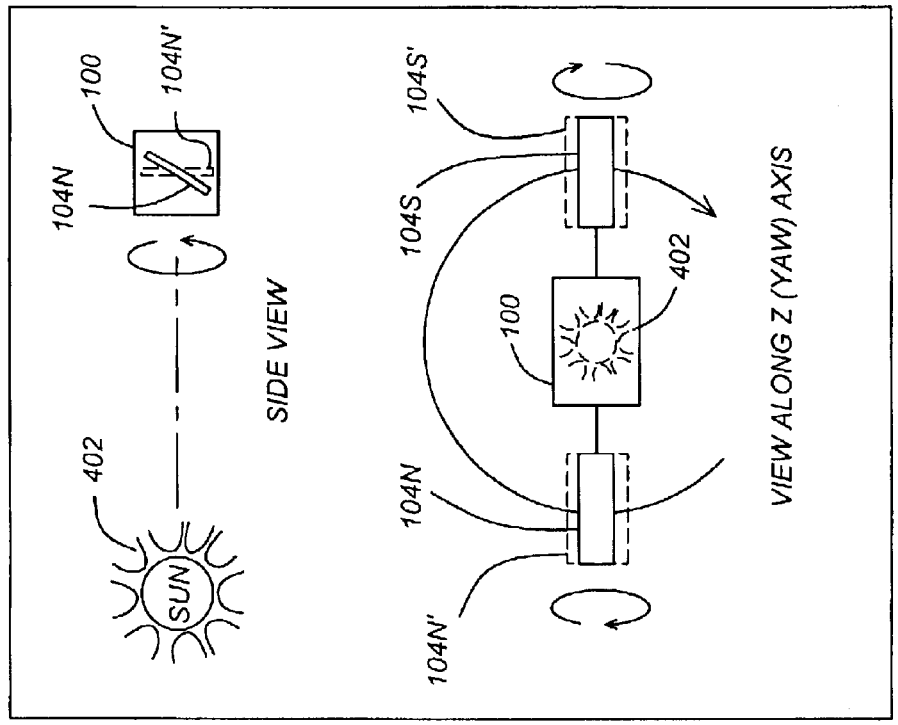
FIGS. 9A and 9B are diagrams showing techniques for applying differential solar torque to the spacecraft.
Figure 9A:
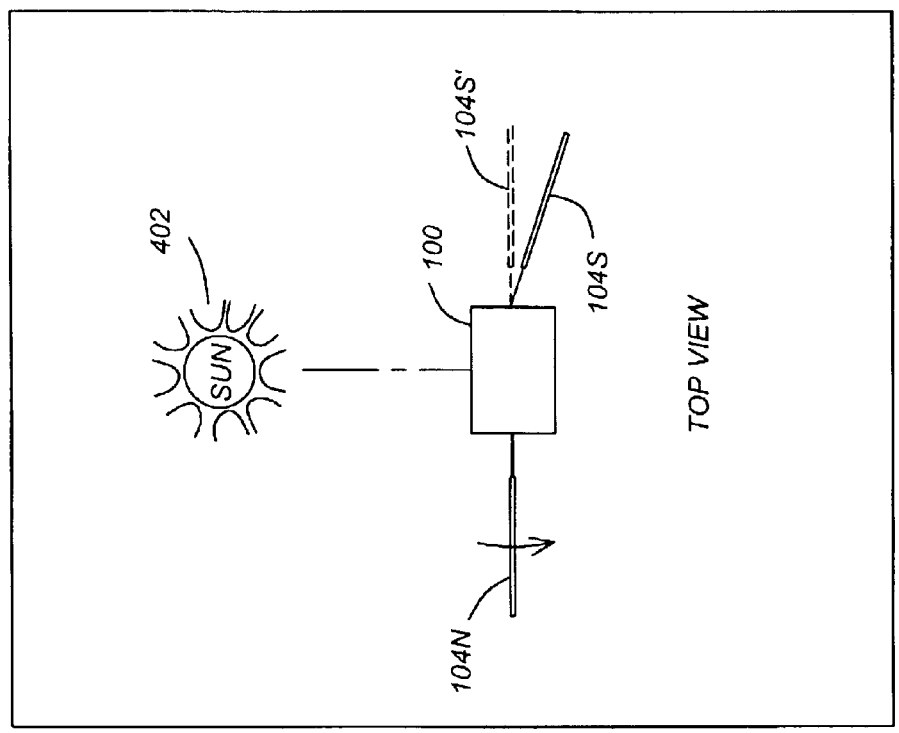

FIGS. 9A and 9B are diagrams showing techniques for applying differential solar torque to the spacecraft 100. FIG. 9A depicts "solar tacking." Solar tacking is implemented by rotating one or more of the solar wings 104 about an axis perpendicular to the longitudinal axis of the solar wing 104 such as the X (roll) axis of the spacecraft (in the X-Z plane).

As shown in FIG. 9A, when solar wing 104S is moved from its nominal position at 104S' to position 104S, there is reduced solar pressure on this side of the spacecraft 100, while the other side of the spacecraft receives the nominal amount of solar pressure. As a result, there is a differential "overturning" torque, and the spacecraft will rotate (roll) in the direction of the arrow shown in FIG. 9A. These solar wing 104 manipulations are useful in countering the environmental torques described above.

FIG. 9B depicts an implementation of "windmilling," in which the spacecraft rotates about the Z (yaw) axis. Here, rotation of the solar wings 104 about the Y axis of the spacecraft 100 (and the longitudinal axis of the wings) causes differential solar torques on each of the solar wings, causing the spacecraft to yaw. If each of the solar wings, 104N or 104S, are rotated in opposite directions from its nominal position 104N' or 104S', substantially equal and opposite solar pressure on each solar wings is theoretically imparted to the spacecraft 100, causing the spacecraft to increase or decrease its momentum along the sun line (extending from the spacecraft to the Sun. These solar wing 104 manipulations can be used to control the spin momentum $H_s$ along the spin axis of the spacecraft.

The amount of differential solar torque that can be applied to the spacecraft 100 by the solar wings 104 is a function of parameters (including solar wing 104 and spacecraft 100 shape and reflectivity as well as the relative orientation of the Sun) which can change over time and be difficult to predict. In one embodiment of the present invention, the amount of differential solar torque resulting from solar wing 104 manipulations is estimated. This can be accomplished by estimating spacecraft angular accelerations using spacecraft angular rate measurements. These angular acceleration estimates are used to more accurately determine the relationship between solar wing 104 manipulations and the resulting differential solar torque. Further solar wing 104 orientation commands can then be suitably adjusted so that the desired differential solar torque is provided.

Conclusion

This concludes the description of the preferred embodiments of the present invention. In summary, the present invention describes a method, apparatus, and memory for controlling the attitude of a spacecraft while deploying an appendage.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing discloses performing many operations using the SCP 202, such operations can be performed by or with the help of auxiliary processors or special purpose hardware modules. Further, such operations can be performed by processors disposed on another satellite or on the ground, with the required data uploaded to the satellite 100 when required.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling an attitude of a spacecraft while deploying an appendage from the spacecraft, the spacecraft having substantially variable mass properties from the appendage deployment, and having a plurality of momentum wheels and a plurality of solar wings, comprising the steps of:

predicting an environmental torque the spacecraft will be subjected to during deployment of the appendage;

computing a magnitude and a direction of momentum to add to the spacecraft to at least partially oppose the predicted environmental torque; and storing the computed magnitude and direction of momentum in at least one of the momentum wheels before deploying the appendage.

2. The method of claim 1, wherein the environmental torque includes an outgassing torque $T_{og}$ component and a solar torque $T_{sp}$ component.

3. The method of claim 1, wherein the momentum includes a transverse momentum component $H_t$ and the step of computing a magnitude and direction of a momentum to add to the spacecraft to at least partially oppose the predicted environmental torque comprises the step of:

computing the transverse momentum $H_t$ perpendicular to the environmental torque and the spacecraft spin axis.

4. The method of claim 1, wherein the momentum includes a transverse momentum component $H_t$ and the step of computing a magnitude and direction of a momentum to add to the spacecraft to at least partially oppose the predicted environmental torque comprises the step of:

computing the transverse momentum $H_t$ to at least partially cancel the dynamic imbalance torque.

5. The method of claim 1, wherein the momentum includes a spin momentum $H_s$, and the step of computing a magnitude and direction of a momentum to add to the spacecraft to at least partially oppose the predicted environmental torque further comprises the step of:

computing the spin momentum $H_s$ along the spin axis of the spacecraft to render the spacecraft passively stable during deployment of the appendage.

6. The method of claim 5, wherein the step of computing a magnitude and direction of momentum to add to the spacecraft to at least partially oppose the predicted environmental torque further comprises the step of determining a spacecraft spin rate $\omega_s$ to substantially minimize a coning angle during the deployment of the appendage.

7. The method of claim 6, wherein the spacecraft spin rate is selected according to $$\omega_{s\_opt} = \frac{H_s}{2I_{spinline}} \frac{\left(\frac{2I_{spinline}}{I_t} - 1\right)}{\left(1 - \frac{I_{spinline}}{I_t}\right)},$$

wherein the spacecraft is symmetric with respect to the spin axis, $I_{spinline}$ is the inertia of the spacecraft along the spacecraft spin axis, and $I_t$ is the inertia of the spacecraft along a transverse axis.

8. The method of claim 6, further comprising the steps of:

deploying the appendage; and orienting at least one of the solar wings to apply differential solar torque to the spacecraft to control the spin momentum $H_s$ along the spin axis of the spacecraft.

9. The method of claim 8, wherein at least one solar wing is oriented to prevent saturation of the momentum wheels.

10. The method of claim 3, further comprising the steps of:

deploying the appendage; and orienting at least one of the solar wings to apply differential solar torque to the spacecraft to control the transverse momentum $H_t$ perpendicular to the environmental torque and the spacecraft spin axis.

11. The method of claim 10, wherein at least one solar wing is oriented to prevent saturation of the momentum wheels.

12. The method of claim 1, wherein the computed magnitude and direction of momentum is stored in the at least one of the momentum wheels before deploying the appendage at least in part via activation of an attitude control thruster.

13. The method of claim 1, further comprising the step of:

deploying the appendage while controlling the attitude of the spacecraft at least in part by the momentum wheels using a measured spacecraft attitude error.

14. The method of claim 1, further comprising the steps of:

deploying the appendage while controlling the attitude of the spacecraft at least in part by orienting at least one of the solar wings to apply differential solar torque to the spacecraft.

15. The method of claim 14, wherein each of the solar wings have a longitudinal axis, and the attitude of the spacecraft is controlled at least in part by rotating the solar wings about a solar wing longitudinal axis.

16. The method of claim 14, wherein each of the solar wings has a longitudinal axis, and the attitude of the spacecraft is controlled by rotating the solar wings about an axis perpendicular to the longitudinal axis.

17. An apparatus controlling an attitude of a spacecraft while deploying an appendage from the spacecraft, the spacecraft having substantially variable mass properties from the appendage deployment, and having a plurality of momentum wheels and a plurality of solar wings, comprising:

means for predicting an environmental torque the spacecraft will be subjected to during deployment of the appendage;

means for computing a magnitude and a direction of momentum to add to the spacecraft to at least partially oppose the predicted environmental torque; and means for storing the computed magnitude and direction of momentum in at least one of the momentum wheels before deploying the appendage.

18. The apparatus of claim 17, wherein the environmental torque includes an outgassing torque $T_{og}$ component and a solar torque $T_{sp}$ component.

19. The apparatus of claim 17, wherein the momentum includes a transverse momentum component $H_t$ and the means for computing a magnitude and direction of a momentum to add to the spacecraft to at least partially oppose the predicted environmental torque comprises:

means for computing the transverse momentum $H_t$ perpendicular to the environmental torque and the spacecraft spin axis.

20. The apparatus of claim 17, wherein the momentum includes a spin momentum $H_s$, and the means for computing a magnitude and direction of a momentum to add to the spacecraft to at least partially oppose the predicted environmental torque further comprises:

means for computing the spin momentum $H_s$ along the spin axis of the spacecraft to render the spacecraft passively stable during deployment of the appendage.

21. The apparatus of claim 20, wherein the means for computing a magnitude and direction of a momentum to add to the spacecraft to at least partially oppose the predicted environmental torque further comprises means for determining a spacecraft spin rate $\omega_s$ to substantially minimize a coning angle during the appendage deployment.

22. The apparatus of claim 21, wherein the spacecraft spin rate is selected according to $$\omega_{s\_opt} = \frac{H_s}{2I_{spinline}} \frac{\left(\frac{2I_{spinline}}{I_t} - 1\right)}{\left(1 - \frac{I_{spinline}}{I_t}\right)},$$

wherein the spacecraft is symmetric with respect to the spin axis, $I_{spinline}$ is the inertia of the spacecraft along the spacecraft spin axis, and $I_t$ is the inertia of the spacecraft along a transverse axis.

23. The apparatus of claim 20, further comprising:
means for deploying the appendage; and
means for orienting at least one of the solar wings to apply differential solar torque to the spacecraft to control the spin momentum $H_s$ along the spin axis of the spacecraft.

24. The apparatus of claim 23, wherein the at least one solar wing is oriented to prevent saturation of the momentum wheels.

25. The apparatus of claim 17, further comprising:
means for deploying the appendage; and
means for orienting at least one of the solar wings to apply differential solar torque to the spacecraft to control the transverse momentum $H_t$ perpendicular to the environmental torque and the spacecraft spin axis.

26. The apparatus of claim 25, wherein the at least one solar wing is oriented to prevent saturation of the momentum wheels.

27. The apparatus of claim 17, further comprising:
means for deploying the appendage while controlling the attitude of the spacecraft at least in part by orienting at least one of the solar wings to apply differential solar torque to the spacecraft.

28. The apparatus of claim 27, wherein each of the solar wings have a longitudinal axis, and the attitude of the spacecraft is controlled at least in part by rotating the solar wings about the longitudinal axis.

29. The apparatus of claim 27, wherein each of the solar wings has a longitudinal axis, and the attitude of the spacecraft is controlled by rotating the solar wings about an axis perpendicular to the longitudinal axis.

30. An apparatus controlling an attitude of a spacecraft while deploying an appendage from the spacecraft, the spacecraft having substantially variable mass properties from the appendage deployment and a plurality of solar wings, comprising:
a processor communicatively coupled to a memory storing instructions for performing computations predicting an environmental torque the spacecraft will be subjected to during deployment of the appendage, and for computing a magnitude and a direction of momentum to add to the spacecraft to at least partially oppose the predicted environmental torque; and
a plurality of momentum wheels for storing the computed magnitude and direction of momentum before deploying the appendage.

31. The apparatus of claim 30, wherein the environmental torque includes an outgassing torque $T_{og}$ component and a solar torque $T_{sp}$ component.

32. The apparatus of claim 30, wherein the momentum includes a transverse momentum component $H_t$ and the instructions for computing a magnitude and direction of a momentum to add to the spacecraft to at least partially oppose the predicted environmental torque comprises:
instructions for computing the transverse momentum $H_t$ perpendicular to the environmental torque and the spacecraft spin axis.

33. The apparatus of claim 30, wherein the momentum further includes a spin momentum $H_s$, and the instructions for computing a magnitude and direction of a momentum to add to the spacecraft to at least partially oppose the predicted environmental torque further comprises:
instructions for computing the spin momentum $H_s$ along the spin axis of the spacecraft to render the spacecraft passively stable during deployment of the appendage.

34. The apparatus of claim 33, wherein the instructions for computing an magnitude and direction of a momentum to add to the spacecraft to at least partially oppose the predicted environmental torque further comprises instructions for determining a spacecraft spin rate $\omega_s$ to substantially minimize a coning angle during the deployment.

35. The apparatus of claim 34, wherein the spacecraft spin rate is selected according to $$\omega_{s\_opt} = \frac{H_s}{2I_{spinline}} \frac{\left(\frac{2I_{spinline}}{I_t} - 1\right)}{\left(1 - \frac{I_{spinline}}{I_t}\right)},$$

wherein the spacecraft is symmetric with respect to the spin axis, $I_{spinline}$ is the inertia of the spacecraft along the spacecraft spin axis, and $I_t$ is the inertia of the spacecraft along a transverse axis.

36. The apparatus of claim 33, further comprising:
an appendage drive for deploying the appendage; and
a solar wing drive for orienting at least one of the solar wings to apply differential solar torque to the spacecraft to control the spin momentum $H_s$ along the spin axis of the spacecraft.

37. The apparatus of claim 36, wherein the at least one solar wing is oriented to prevent saturation of the momentum wheels.

38. The apparatus of claim 32, further comprising:
an appendage drive for deploying the appendage; and
a solar wing drive for orienting at least one of the solar wings to apply differential solar torque to the spacecraft to control the transverse momentum $H_t$ perpendicular to the environmental torque and the spacecraft spin axis.

39. The apparatus of claim 35, wherein the at least one solar wing is oriented to prevent saturation of the momentum wheels.

40. The apparatus of claim 30, further comprising:
a solar wing drive for controlling the attitude of the spacecraft at least in part by orienting at least one of the solar wings to apply differential solar torque to the spacecraft.

41. The apparatus of claim 40, wherein each of the solar wings have a longitudinal axis, and the attitude of the spacecraft is controlled at least in part by rotating the solar wings about the longitudinal axis.

42. The apparatus of claim 40, wherein each of the solar wings has a longitudinal axis, and the attitude of the spacecraft is controlled by rotating the solar wings about an axis perpendicular to the longitudinal axis.

* * * * *